N. AND G. W. LEA.
ADJUSTABLE AUTOMOBILE BEARING.
APPLICATION FILED SEPT. 13, 1917.
1,303,213. Patented May 6, 1919.
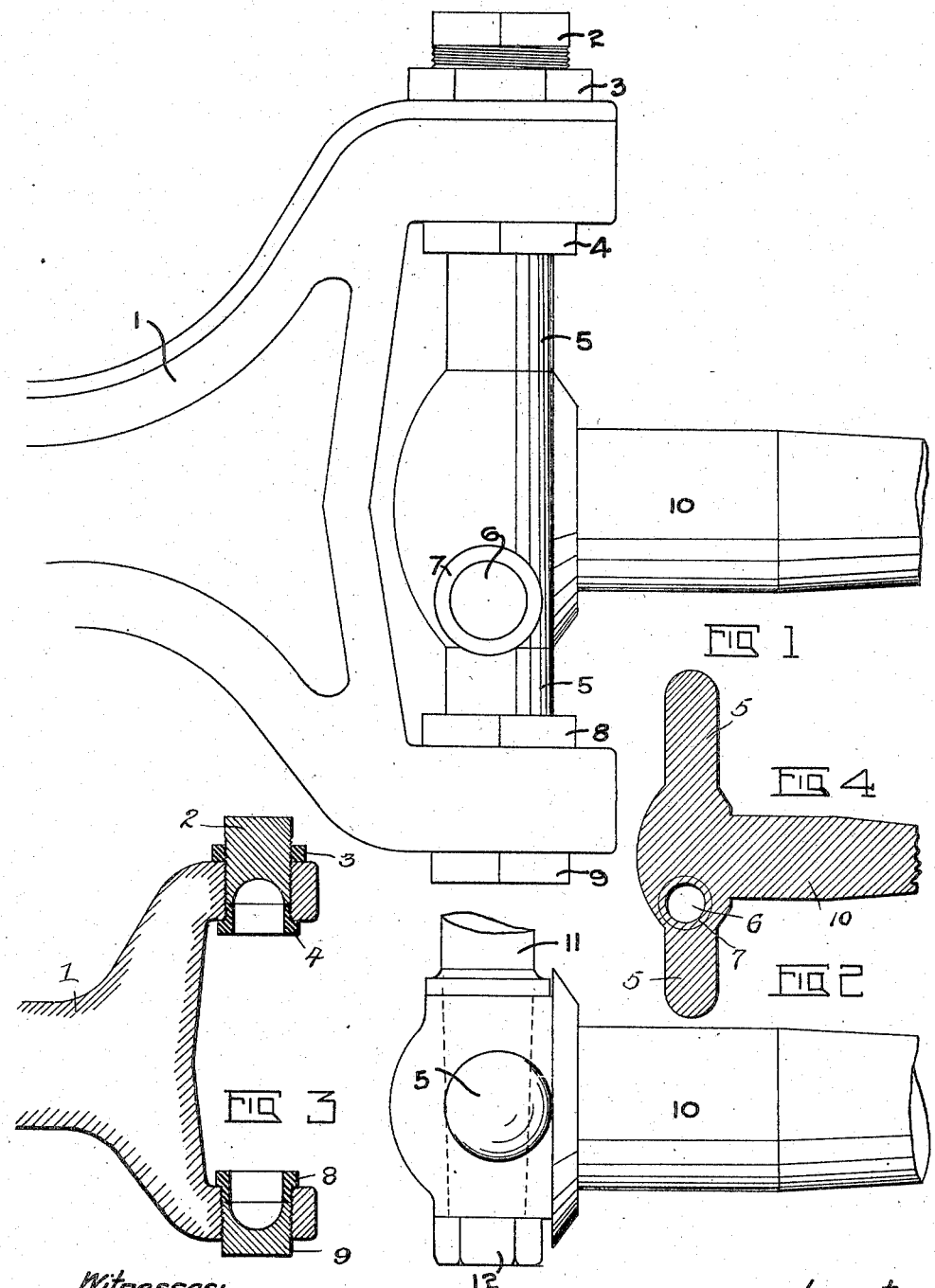

UNITED STATES PATENT OFFICE.

NATHANIEL LEA AND GEORGE WYLLS LEA, OF CALGARY, ALBERTA, CANADA.

ADJUSTABLE AUTOMOBILE-BEARING.

1,303,213.  Specification of Letters Patent.  Patented May 6, 1919.

Application filed September 13, 1917. Serial No. 191,263.

*To all whom it may concern:*

Be it known that we, NATHANIEL LEA and GEORGE WYLLS LEA, both citizens of the Dominion of Canada, residing at 208 # Alberta Corner, in the city of Calgary, in the Province of Alberta, Dominion of Canada, have invented new and useful Improvements in Adjustable Automobile-Bearings, of which the following is a specification.

Our invention relates to improvements in adjustable bearings for steering knuckles on automobile axles, and the primary object is to provide a bearing which may be adjusted and oiled with facility and which will hold the supported parts firmly in position. The mechanism used eliminates all wear which ordinarily is incident where a spindle bolt and bushings are used.

These objects are attained by the mechanism illustrated in the accompanying drawings in which similar figures refer to similar parts throughout the several views and in which:

Figure 1 is a side elevation of a portion of an automobile axle with bearings constructed in accordance with this invention.

Fig. 2 is a portion of the movable part of such an axle (the bearings not shown).

Fig. 3 is a vertical cross-sectional view of a portion of said axle showing the bearings constructed in accordance with this invention, and Fig. 4 is a vertical cross-sectional view of the movable part of said axle which is held in said bearings.

Referring more particularly to the drawings 1 is one end of the stationary portion of an automobile axle.

9 is an externally threaded bearing set in an internally threaded perforation in the lower arm of the axle 1.

8 is an externally threaded dust collar set in the said internally threaded perforation in the lower arm of the axle 1.

2 is an externally threaded bearing set in an internally threaded perforation in the upper arm of the axle 1.

4 is an externally threaded dust collar set in the said internally threaded perforation in the upper arm of the axle 1.

3 is a jam-nut internally threaded, and mounted on the bearing 2.

10 is a portion of an automobile axle upon which an automobile wheel (not shown) is mounted for rotation and having the vertical arms 5—5 mounted in the bearings 9 and 2 for partial rotation.

The assembling of the mechanism is as follows:—

The dust collars 4 and 8 are slipped over opposite arms 5—5 which arms are then inserted in opposite perforations in the axle 1.

The bearing 9 is then turned into the perforation in the lower arm of the axle 1 until tightened. The bearing 2 is then turned into the perforation in the upper arm of the axle 1 until the axle 10 is held firmly but allowed to rotate. The jam-nut 3 is then tightened to hold the bearing 2 in place. The dust collars 4 and 8 are then turned into the perforations as shown in Figs. 1 and 3. The bearing 2 may be tightened or loosened as required from time to time.

While in this specification and in these drawings we have shown our invention together with certain features of construction and applied to a particular form of automobile axle, it is our intention that this application should cover such variations as may be necessary to suit practical conditions, so long as the same are contemplated in what is claimed.

We claim:—

In bearings for automobile axles and in combination of two cup-shaped bearings threaded into opposite arms of an automobile axle, a spindle-shaped member having arms with convex ends each fitting into one of said cup-shaped bearings, dust collars on said arms of the spindle-shaped member threaded into said arms of the automobile axle—a jam-nut on the upper of said cup-shaped bearings.

Signed at the city of Calgary, in the Province of Alberta, this 22nd day of August, A. D. 1917.

NATHANIEL LEA.
GEORGE WYLLS LEA.

In the presence of—
C. MONTROSE WRIGHT,
ANNIE M. LA MARCHE.